United States Patent
Christopher et al.

(10) Patent No.: US 11,900,935 B2
(45) Date of Patent: *Feb. 13, 2024

(54) SYSTEM AND METHOD FOR SECURING ELECTRONIC DEVICES

(71) Applicant: INSIGHT HOLDING GROUP, INC., Keller, TX (US)

(72) Inventors: Kimberly Christopher, San Diego, CA (US); James Christopher, San Diego, CA (US); Ken Tirman, San Diego, CA (US)

(73) Assignee: Insight Holding Group, Inc., Keller, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/666,374

(22) Filed: Feb. 7, 2022

(65) Prior Publication Data

US 2022/0165271 A1 May 26, 2022

Related U.S. Application Data

(63) Continuation of application No. 16/432,860, filed on Jun. 5, 2019, now Pat. No. 11,244,678, which is a continuation-in-part of application No. 15/698,596, filed on Sep. 7, 2017, now Pat. No. 10,354,648.

(51) Int. Cl.
| | |
|---|---|
| *G10L 15/22* | (2006.01) |
| *H04R 1/40* | (2006.01) |
| *H04K 3/00* | (2006.01) |
| *H04R 3/00* | (2006.01) |
| *H04N 23/60* | (2023.01) |

(52) U.S. Cl.
CPC .............. *G10L 15/22* (2013.01); *H04K 3/92* (2013.01); *H04N 23/60* (2023.01); *H04R 1/406* (2013.01); *H04R 3/005* (2013.01); *G10L 2015/223* (2013.01)

(58) Field of Classification Search
CPC ... G10L 15/22; G10L 2015/223; G10L 15/26; G10L 15/1815; G10L 15/183; G10L 15/265; G10L 15/1822; G10L 2015/228
See application file for complete search history.

(56) References Cited

U.S. PATENT DOCUMENTS

| | | |
|---|---|---|
| 8,660,849 B2 | 2/2014 | Gruber |
| 8,677,377 B2 | 3/2014 | Cheyer |
| 8,892,446 B2 | 11/2014 | Cheyer |

(Continued)

*Primary Examiner* — Vijay B Chawan
(74) *Attorney, Agent, or Firm* — Sheppard Mullin Richter & Hampton LLP

(57) ABSTRACT

Embodiments disclosed herein include security systems and methods for securing an electronic device. In some embodiments, the security system may include an electronic device including surveillance components, including a microphone and a camera. The security device may be secured to the electronic device in a way that blocks or interferes with one or more of these surveillance components. Additionally, the security device may be placed near or on the electronic device. The security device may also include security components to distort sounds from a sound source to be detected by the microphone. As a result, this may prevent third parties from at least remotely streaming or recording live audio and/or video from various audio and video recording components present on the electronic device.

16 Claims, 8 Drawing Sheets

(56) References Cited

U.S. PATENT DOCUMENTS

| | | | |
|---|---|---|---|
| 8,924,708 B2 | 12/2014 | Yoffe | |
| 9,124,792 B2 * | 9/2015 | Barangan | G03B 31/00 |
| 9,213,558 B2 | 12/2015 | Tur | |
| 9,318,108 B2 | 4/2016 | Gruber | |
| 9,338,493 B2 | 5/2016 | Van Os | |
| 9,495,129 B2 | 11/2016 | Fleizach | |
| 9,633,674 B2 * | 4/2017 | Sinha | G10L 15/22 |
| 9,858,925 B2 | 1/2018 | Gruber | |
| 9,886,953 B2 | 2/2018 | Lemay | |
| 9,971,774 B2 * | 5/2018 | Badaskar | G10L 15/22 |
| 9,972,304 B2 * | 5/2018 | Paulik | G10L 15/063 |
| 2002/0194005 A1 * | 12/2002 | Lahr | G10L 15/24 |
| | | | 704/E15.041 |
| 2007/0100790 A1 * | 5/2007 | Cheyer | G06N 7/01 |
| 2007/0226033 A1 * | 9/2007 | LoPresti | G06Q 10/063114 |
| | | | 705/7.15 |
| 2012/0016678 A1 * | 1/2012 | Gruber | G06F 40/30 |
| | | | 704/E21.001 |
| 2012/0019978 A1 | 1/2012 | Yoshida | |
| 2012/0166365 A1 * | 6/2012 | Tur | G06F 9/453 |
| | | | 706/11 |
| 2012/0265528 A1 * | 10/2012 | Gruber | G10L 15/183 |
| | | | 704/235 |
| 2013/0275164 A1 * | 10/2013 | Gruber | G10L 17/22 |
| | | | 705/5 |
| 2013/0340069 A1 * | 12/2013 | Yoffe | G06F 21/82 |
| | | | 726/17 |
| 2015/0068069 A1 | 3/2015 | Tran | |
| 2015/0341812 A1 | 11/2015 | Dion | |
| 2016/0260436 A1 * | 9/2016 | Lemay | G10L 15/22 |
| 2017/0358301 A1 * | 12/2017 | Raitio | G10L 25/18 |

* cited by examiner

SYSTEM AND METHOD FOR SECURING ELECTRONIC DEVICES

CROSS-REFERENCE TO RELATED APPLICATIONS

This application is a continuation of U.S. patent application Ser. No. 16/432,860, filed on Jun. 5, 2019, which is a continuation-in-part of U.S. patent application Ser. No. 15/698,596, filed on Sep. 7, 2017, the contents of which are incorporated by reference herein.

TECHNICAL FIELD

The disclosed technology relates generally to securing electronic devices. More specifically, in one embodiment, the disclosed technology relates generally to securing electronic devices that are connected to the internet and commanded by voice control.

BACKGROUND

Electronic devices continue to provide an ever growing number of functions, services, and applications as people continue to find ways to integrate them into our daily lifestyle. Indeed, current consumer electronic devices are available to instantly provide information and even perform select automated tasks at any given notice. For example, such popular electronic devices are the intelligent automated assistant devices that respond to voice commands and perform the recognized commands accordingly. Such examples of these intelligent automated assistant device include the Amazon Echo® with the Alexa voice control system, Google Home, Apple iPhone® with Siri voice system, Android phone with the Cortana voice recognition system, and the like. These intelligent automated assistant devices may then be connected to and control security systems (e.g., video, cameras, door locks, etc.), appliances, environment controls (e.g., heating and air conditioning controllers), and the like.

Due to their promise of convenience, these intelligent automated assistant devices with voice control technology are growing in popularity as they are now becoming a common item in many households, where some even have one placed in every room. More specifically, these intelligent automated assistant devices may be coupled with Internet technologies and even connected to other supported electronic devices and systems, which may allow these intelligent automated assistant to perform a greater number of applications and functions. As such, these intelligent automated assistant devices may then enable its users to verbally connect with the device and even control internet searches, entertainment systems, home appliances, environmental systems, security systems, and other electronic devices. However, while intelligent automated assistants offer the convenience of controlling a plurality of devices and systems all with a single electronic device, they also pose a serious potential threat to our personal privacy.

This is because most electronic assistants are always "listening" and on standby to hear for recognized audio commands. As such, the intelligent automated assistants may continuously and passively be gathering or monitoring auditory and even visual data. Furthermore, if the intelligent automated assistant devices are connected to the Internet, as most intelligent automated assistant devices are, it is a possible scenario that another person may remotely gain access and control of the intelligent automated assistant device without the owner's awareness or consent. Thus, the person may be able to gain access to any of the microphones and cameras located on the intelligent automated assistant device, which may then allow the person to stream or record live audio and visual feeds. Thus, the owner may be unaware that his or her intelligent automated assistant device has been compromised and that the area immediately surrounding the intelligent automated assistant device is no longer safe or private. Thus, there is a real privacy threat posed by these intelligent automated assistant devices.

BRIEF SUMMARY OF EMBODIMENTS

According to various embodiments of the disclosed technology, disclosed are security systems and methods for securing an electronic device in accordance to varying embodiments.

Some embodiments may include a security system which may include an electronic device comprising at least one of a first microphone and a security device placed at, on, or near the electronic device, where the security device includes security components configured to block sounds from a sound source being detected by the first microphone.

In some embodiments, the security device may be powered on, off and/or placed in an active or inactive mode via voice activation control. For example, powering on and/or placing the security device into an active mode may enable one or more security components provided in the security device to prevent the electronic device from collecting proper audio by the first microphone.

Other features and aspects of the invention will become apparent from the following detailed description, taken in conjunction with the accompanying drawings, which illustrate, by way of example, the features in accordance with embodiments of the invention. As such, the summary is not intended to limit the scope of the invention.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
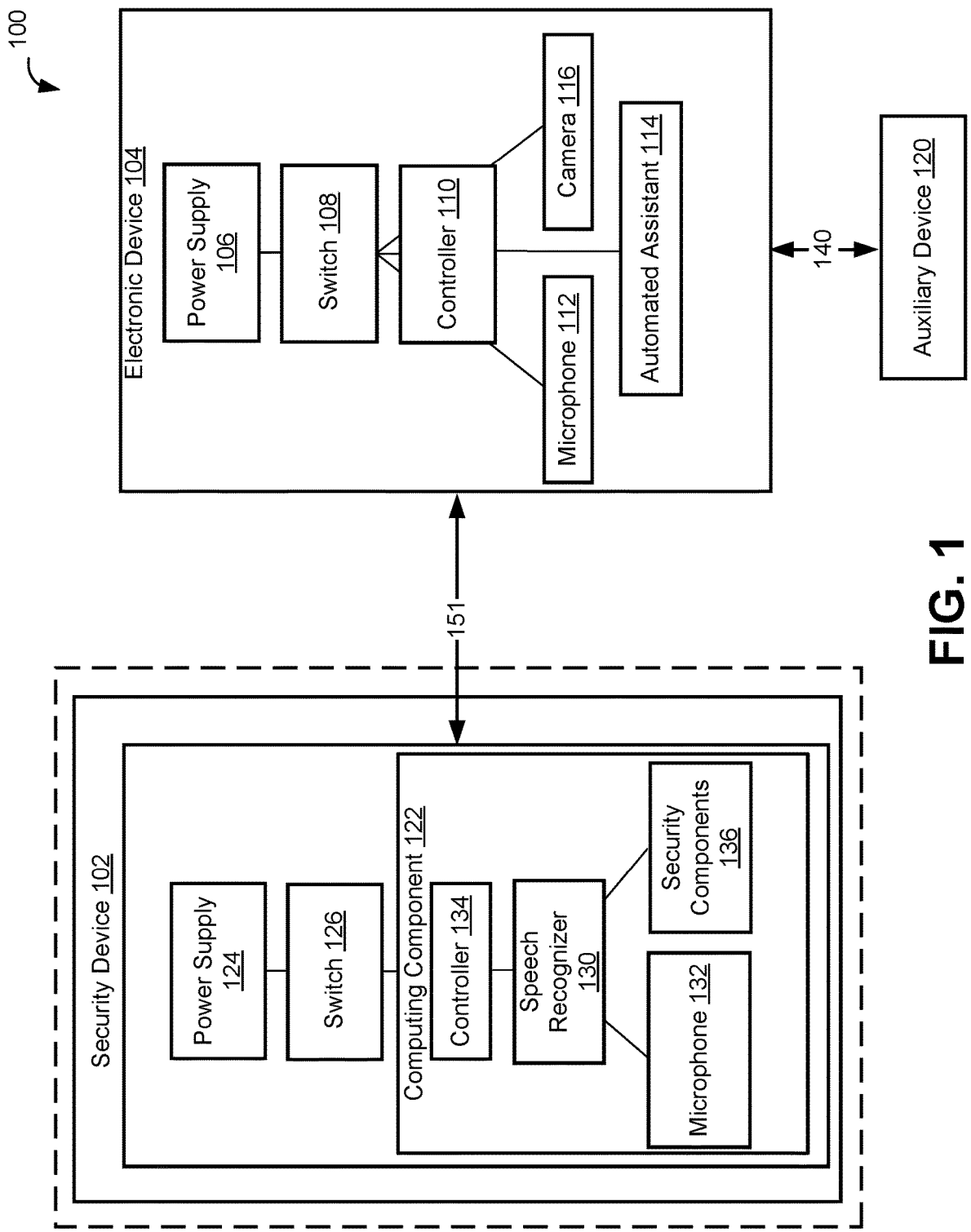
FIG. 1 is a schematic representation of a security system in accordance with various embodiments.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The following description is not to be taken in a limiting sense, but is made merely for the purpose of describing the general principles of the disclosed embodiments. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

As alluded to above, consumers utilize a number of intelligent automated assistant devices that respond to voice commands and perform the recognized commands accordingly. Such examples of these intelligent automated assistant device include the Amazon Echo® with the Alexa voice control system, Google Home, Apple iPhone® and Apple® HomePod with Siri voice system, Android phone with the Cortana voice recognition system, Facebook® Portal that has incorporated Alexa voice control system, and the like. In some implementations, these intelligent automated assistant devices may then be connected to and control security systems (e.g., video, cameras, door locks, etc.), appliances, environment controls (e.g., heating and air conditioning controllers), and the like. For example, Philips® Hue, which uses Zigbee lighting protocol, may be controlled via the Amazon, Apple, and/or Android devices described above. In some embodiments, intelligent automated assistant capabilities may be incorporated into motor vehicles. For example, several automotive manufacturers offer its drivers in-vehicle communications and entertainment systems which provides drivers with the ability to operate Bluetooth-enabled mobile phones and digital media players in their vehicles using voice commands, as well as the vehicle's steering wheel and/or radio controls (e.g., OnStar®, Ford Sync, Microsoft Auto, Kia UVO, and so on).

Additionally, a number of "smart", internet-connected, electronic devices (e.g., security systems, video doorbells, thermostat controllers, door locks, environmental monitors and the like) that do not require use of an intelligent automated assistant device are currently utilized by consumers. Nonetheless, these intelligent consumer devices often continuously collect data via an on-board microphone or video camera. For example, home security or video doorbell devices, such as Amazon Ring or Google Nest, not only monitor a homeowner's front door by recording surveillance footage, they also allow users to communicate with a visitor from outside their home (e.g., via a user mobile device).

Similarly, other common internet-connected consumer electronic devices may be operating in a way that requires continuous and passive auditory and visual data collection. For example, televisions (e.g., Samsung, Sony), smartphones (e.g., Apple iPhone, Samsung Galaxy, Google Pixel), tablet computers (e.g., Apple iPad, Amazon Fire, Samsung Galaxy), laptop computers, and desktop computers equipped with webcams (e.g., Logitech webcam) may be all accessed and without owner's consent or knowledge.

As alluded to above, both intelligent automated assistant devices and internet-connected electronic devices, operating either with the help of an intelligent automated assistant or on their own, are equipped with means to continuously and passively collect or monitor auditory and visual data via one or more on-board device components (e.g., via a microphone, a camera or a speaker). These device components may potentially be accessed without owner's awareness knowledge or consent.

Accordingly, described herein is a device for securing any electronic device (e.g., an automated assistant device or an internet-connected electronic device) by preventing surveillance components within the electronic device (e.g., a microphone or a camera) from being utilized without owner's consent or knowledge. That is, the security device prevents third parties from collecting audio or video data generated by the surveillance components within the operating range of any of these components.

FIG. 1 is a schematic representation of a security system 100 in accordance with various embodiments. The security system 100 may include a security device 102 that is implemented to help provide increased privacy measures for an electronic device 104. For example, the electronic device 104 may be an intelligent automated assistant device configured with the intelligent automated assistant program 114 (e.g., Amazon Alexa). In some embodiments the electronic device 104 may be an internet-connected electronic device operating without the intelligent automated assistant program 114. For example, the electronic device 104 may be a video doorbell, a thermostat controller, a door lock, and so on. In yet other embodiments, the electronic device 104 may be a television, a smartphone, a tablet computer, a laptop computer, and so on.

In some embodiments, the electronic device 104 may be configured to receive one or more commands from a user. For example, electronic device 104 may be configured to recognize and respond to voice commands and ensure that the recognized commands are carried out and executed accordingly. In some embodiments, the electronic device 104 may be configured to receive user input from one or more user operated devices (not shown) communicatively coupled to the electronic device. For example, a user may generate a command from a tablet computer wirelessly connected to a door bell. In some embodiments, the user operated device may be in communication with the electronic device 104 via a network 140 through a wireless communication or wired communication. The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol. The wireless communication may also include at least one of, for example, WiFi, Bluetooth, BLE, Zigbee, Infrared (IR) communication, and ultrasonic communication as a short-range communication protocol.

In some embodiments, as alluded to earlier, the electronic device 104 may include the intelligent automated assistant program 114 configured to control many features and operations of the electronic device 104 on which it is installed. Additionally, the intelligent automated assistant device 104 may also be connected to compatible auxiliary devices 120

(e.g., hand held devices, Bluetooth speakers, wireless appliances, etc.), thus allowing the electronic device 104 to also control those connected auxiliary devices 120. Thus, the intelligent automated assistant program 114 may be able to provide external services that interface with functionality and application available on the electronic device 104 itself or those from the auxiliary devices 120. For example, such functions and operations may include, for example, setting an alarm, making a telephone call, sending a text message or email message, adding a calendar event, lowering the thermostat, turning on the light, and the like.

In some embodiments, the intelligent automated assistant program 114 may be in communication with the auxiliary devices 120 via a network 140 through a wireless communication or wired communication. The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol. The wireless communication may also include at least one of, for example, WiFi, Bluetooth, BLE, Zigbee, Infrared (IR) communication, and ultrasonic communication as a short-range communication protocol.

The intelligent automated assistant program 114 may also perform user requested functions and operations based on the verbal communications with the electronic device 104 via voice control or voice recognition. The microphone 112 may receive speech input signals, which may then be analyzed against a recognition set to detect and analyze the audio contents.

In some embodiments the electronic device 104 may include a controller 110 which may also be coupled to the switch 108, where the switch 108 may turn off or turn on a power supply 106. Furthermore, the controller 110 may regulate the amount of power from the power supply 106 is distributed to the electronic device 104. For example, when the electronic device 104 is in a sleep mode or standby mode, low or minimal power may be distributed to the electronic device 104. In other instances, when the electronic device 104 is in the active mode, normal power may be distributed to the electronic device at full capacity.

In some embodiments, the electronic device 104 may also include a video recording component. For example, the electronic device 104 may include a camera 116. By way of example, the camera 116 may provide live streaming of images and video feeds of the areas immediately surrounding the electronic device 104. In some instances, the camera 116 may provide continuous streaming of images and video feeds, which may then be uploaded onto a network or in a memory storage device. In other instances, the camera 116 may record images and video feeds upon user request for a select duration. In some embodiments, the camera 116 may be selectively activated. For example, the camera 116 may be activated by one or more recognized voice commands or by motion. However, it should be noted that the electronic device 104 may or may not have a camera 116 and that the camera 116 is an optional feature.

In some embodiments, the security device 102 may be secured to the electronic device 104 via a fastening means 151. For example, the fastening means, described in greater detail below, may include a number of mechanism and/or components such as notch connectors, screw-in connectors, magnetic connectors, and so on, configured to securely hold the security device 102 to the electronic device 104. Conversely, in some embodiments, security system 100 may include a security device 102 that is not secured to the electronic device 104. Rather, as described in detail below, the security device 102 may be placed at or near the electronic device 104.

In some embodiments, the security device 102 may be configured to allow it to be connected or disconnected from the internet. By virtue of having the capability to disconnect the security device 102 from the internet, ensures that any potentially hacked or compromised electronic devices 104 caused by unauthorized third parties cannot cause potential hacking into the security device 102 itself. Rather, the security device 102 may include its own independent processor and software to employ the security measures against any potential privacy threats as described in further detail below.

By way of example, the security device 102 may include its own computing component 122, which may include bus, a processor, a memory, storage devices, input/output interface, and a communication interface. The security device 102 may also include its own independent power supply 124. In some instances, similar to the electronic device 104, the security device 102 may also be triggered to recognize and execute actions based on identification of recognized voice commands. Thus, similar to the electronic device 104, the security device 102 may include its own microphone 132 coupled to a speech recognizer 130. The microphone 132 may receive speech input signals, which may then be analyzed against a recognition set within the speech recognizer 130 to detect and analyze the audio contents. The speech recognizer 130 may be coupled to the controller 134, which may control the operations of the security device 102 based on the recognition results of the identified verbal commands. As a result, the microphone 132 and the speech recognizer 130 may allow a user to command the security device 102 and enable or disable security components 136 based on the recognized user commands. Byway of example, the speech recognizer 130 may recognize voice commands that may enable powering on or off the security components of the security device 102. More information regarding the security components 136 are further described below in detail.

The controller 134 may also be coupled to the switch 126, where the switch 126 may turn off or turn on the power supply 124. Furthermore, the controller 134 may regulate the amount of power distributed from the power supply 124 to the security device 102. For example, when the security device 102 is in a sleep mode or standby mode, low or minimal power may be distributed to the security device 102. In other instances, when the security device 102 is in the active mode, normal power may be distributed to the security device 102 at full capacity.

Additionally, in some embodiments, the security device 102 may also include one or more security components 136. The security components 136 may include security features that ensure the privacy of the user of the electronic device 104 is not jeopardized by unwarranted third parties seeking to spy or monitor on an unsuspecting user via unapproved remote access to the microphone 112 and camera 116 on the electronic device 104. By way of example, the security components 136 may include a speaker or white noise component for generating and emitting white noise directed to the electronic device 104. By emitting white noise, the microphone 112 on the electronic device 104 may not be able to pick up and decipher conversations or other sounds from the room. As a result, the microphone 112 may then only be able to pick up these distorted or muffled noises.

By way of example, the white noise component may include a digital/analog converter coupled to a memory with prerecorded white noise sounds. The analog output with a digital/analog converter may be amplified with an audio amplifier and played through the speaker on the security device 102 in order to emit the white noise. It should be noted that the white noise components may include any of the standard components used to emit white noise as typically used and appreciated by any one of ordinary skill in the art.

Additionally, the security components 136 may also include a noise cancelling component for cancelling sounds and noises generated from conversations and objects. This may further prevent and disrupt the electronic device 104 from picking up any clear audio. By way of example, the noise cancelling component may include detecting sounds and emitting sounds waves with the same amplitude but with inverted phase, also known as the antiphase to the original sound. By emitting such sound waves, this may then result in destructive interference with the original sound so that the microphone 112 from the electronic device 104 will not pick up clear audio from the sound source.

By way of example, the noise cancelling component may include a transducer to pick up any detected noises or sounds. The noise may be filtered through an amplifier and pass through a digital audio filter, where the noise signal may be analyzed. The noise signal may be broken down into its fundamental harmonics, which can result in one or more analyzed audio signals. The signals may then be passed onto the mixer circuit so that the signals are analyzed to then emit a sound wave that is inverted from the original sound signal. When the inverted sound wave is emitted from the security device 102, the electronic device 104 may receive both the sound signals of the original sound and that of the inverted sound wave, which may then result in the destructive inference so that the original sounds are no longer recognized. It should be noted that the noise cancelling components may include any of the standard components used to cancel or alter sounds as typically used and appreciated by any one of ordinary skill in the art.

Figure 2B:
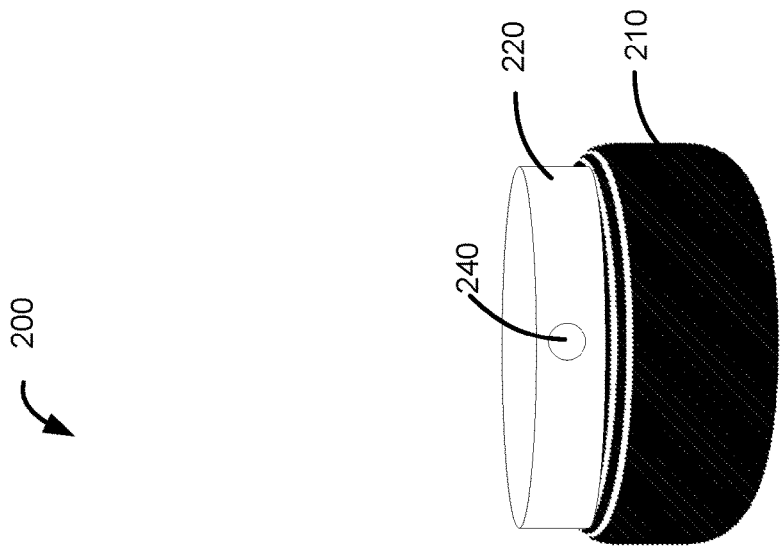
FIGS. 2A-2D illustrates a security system for an intelligent automated assistant device or any electronic device in accordance with one embodiment.
Figure 2A:
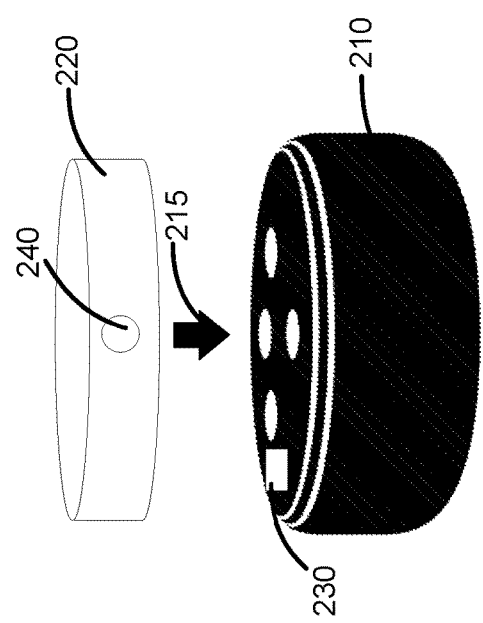

FIGS. 2A-2D illustrates a security system 200 that includes an electronic device 210 and a security device 220 in accordance with one embodiment. As illustrated in FIGS. 2A-2B, the electronic device 210 is an intelligent automated assistant device. The security device 220 illustrated in FIG. 2A is being placed on top of the electronic device 210, as indicated by an arrow 215 resulting in the security device 220 being secured to the electronic device 210, as illustrated in FIG. 2B. As alluded to earlier, by virtue of the security device 220 being secured to the electronic device 210 may provide the necessary security measures that prevent third parties from recording or streaming live conversations picked up by a microphone 230 of the electronic device 210 (in this case, intelligent automated assistant device). As a result, the security device 220 may include one or more security components associated with the security device 220 that distort, muffle, and conceal the conversations to prevent the microphone 230 associated with the electronic device 210 from detecting or receiving clear sound signals from a sound source.

In some embodiments, the security components may include emitting white noise and noise cancelling signals towards the electronic device 210. As a result, even if a third party were to remotely access the electronic device 210 and its microphone 230, the security device 220 will ensure that any recorded or streamed audio feed picked up by the microphone 230 of the electronic device 210 will be distorted, muffled, or jammed. Thus, the user's privacy may be maintained even if a third party were to remotely access the electronic device 210.

In some embodiments, the electronic device 210 may be powered on or off. By way of example, the electronic device 210 may be powered on and off via recognized voice commands. When the electronic device 210 is powered on to be used by a user, the security device 220 may be turned off in order to ensure proper operation of the electronic device 210. By way of example, the security device 220 may also be appropriately turned on or turned off via one or more recognized voice commands. For example, a microphone 240 on the security device 220 may continuously detect for audible noise and analyze such noises for recognized voice commands.

Figure 2D:
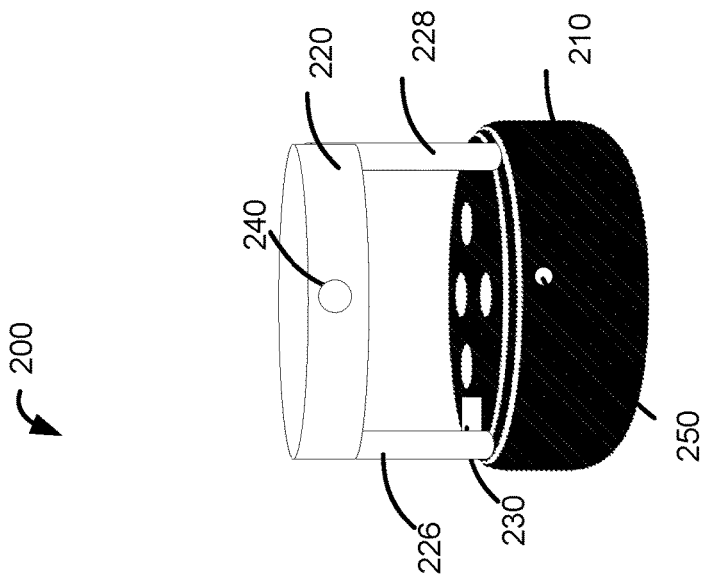
Figure 2C:
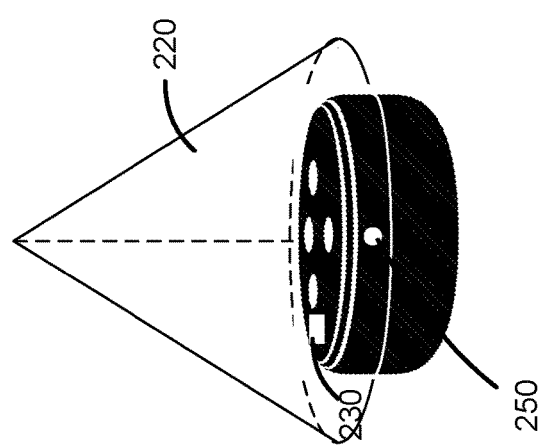

As illustrated in FIG. 2B, the security device 220, placed over electronic device 210, may have a shape corresponding to that of the electronic device 210. For example, the security device 220 may have approximately the same dimensions as the electronic device 210. In some embodiments, the security device 220 may be dimensioned to be larger than the electronic device 210. For example, as illustrated in FIG. 2C, the security device 220 may be cone shaped, so that it may be easily placed over electronic devices of various sizes and shapes. In some instances, the cone-shaped security device 220 may be balanced on top of the electronic device 210 without any additional structural support. However, it should be noted that the security device 220 is not limited to any particular shape of any particular dimensions. Instead, the security device 220 may come in any shape or size as needed to cover or envelope certain areas of the electronic device 210, such as the areas where a video camera 250 associated with the electronic device 210 is located. In some embodiments, the shape of the security device 220 may include a square prism, rectangular prism, a cylinder, a sphere, a pyramid, and the like.

Additionally, the security device 220 may also include the above mentioned security components that will allow the emittance of white noise and noise cancelling signals at the electronic device 210. Thus, the security device 220 may also be able to ensure that any recorded or streamed audio feed picked up by the microphone 230 will be distorted, muffled, or jammed.

In some embodiments, the security device 220 may be supported by structural elements to allow the security device 220 to be elevated above the electronic device 210 without removing it. In some For example, as illustrated in FIG. 2D, the security device may include structural elements 226, 228 configured to elevate the security device 220 above the electronic device 210 in order to permit the functioning of the electronic device without removing the security device 220.

Figure 3B:
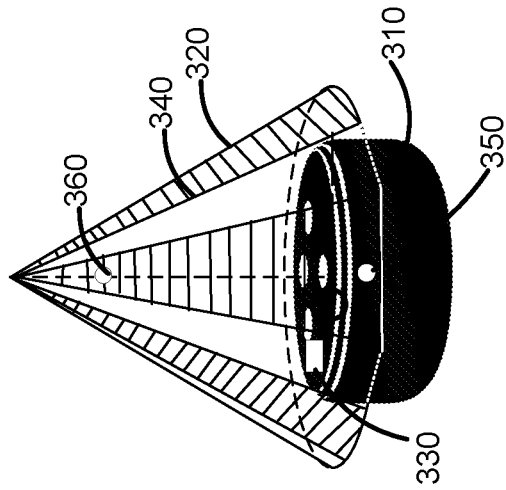
FIGS. 3A-3B illustrates a security device placed over an intelligent automated assistant device or any electronic device in accordance to one embodiment.
Figure 3A:
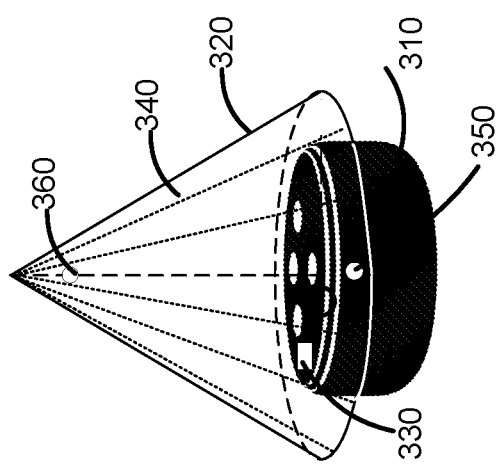

FIG. 3A illustrates a security device 320 in an active mode placed over an electronic device 310 in accordance with one embodiment. Additionally, FIG. 3B illustrates a security device 320 in a non-active modes placed over electronic device 310 in accordance with one embodiment. FIGS. 3A-3B will be explained herein together in detail.

In FIG. 3A, the active mode may be designated when the security device 320 is appropriately enveloped to completely surround or cover select areas of the electronic device 310. The components of the security device 320 may include those as described above with reference to FIGS. 2A-2B. By way of example, the security device 320 in the closed mode may completely cover the top portions of the electronic device 310, especially in areas where the camera 350 may be located. By appropriately placing the security device 320 over the camera 350, the camera 350 will no longer be able to take images or videos of the immediately surrounding space or area where the electronic device 310 is located. Thus, even in the instance where a third party may gain unapproved remote access to the camera 350 of the electronic device 310, the security device 320 may effectively block the third party from streaming or recording images/video feed of the surrounding areas. Instead, the third party will only be able to view a blacked out image or video feed as a result of the security device 320 effectively covering the camera 350.

In some instances, the security device 320 may also be composed of sectionalized pieces 340, where the sectionalized pieces overlap, physically fold, slide, lift up, flip, or rotate in order to provide openings of the security device 320 itself. By doing so, this may also expose the areas of the electronic device 310 that were once covered, as further depicted in FIG. 3B.

Figure 4:
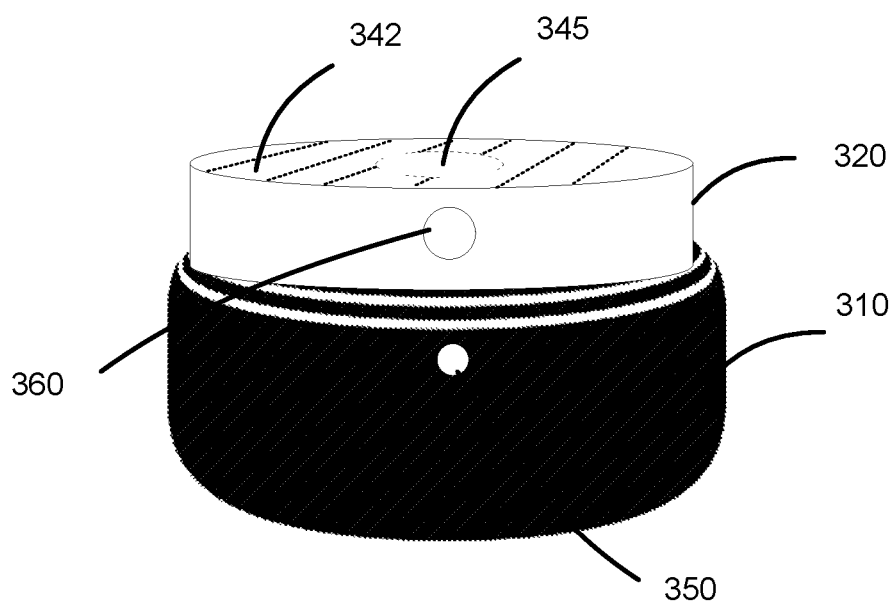
FIG. 4 illustrates a security device having an aperture placed over an intelligent automated assistant device or any electronic device in accordance with one embodiment.

As illustrated in FIG. 3B, the sectionalized pieces 340 of the security device 320 may be overlapped to provide openings within the security device 320. When the openings are created, this may indicate that the security device 320 is now in the non-active mode, where one or more of the security features or components are deactivated and thus allow continued full operation of the electronic device 310. More specifically, the openings may now allow the camera 350 to be exposed to the environment. Additionally, in the non-active mode, this may further expose the microphone 330 to the environment, which may allow the microphone 330 to more readily pick up and recognize the voice command and record sounds. Similarly, as illustrated in FIG. 4, the security device 320 may include an aperture 345 that can be exposed. For example, the top portion of the security device 320 may include sectionalized pieces 342 which may be moved so as to expose the aperture within the security device 320, thereby allowing the electronic device 310 to be fully functional. In some embodiments, the sectionalized pieces 342, illustrated in FIG. 4, may lift up, flip, or rotate.

Furthermore, in the non-active mode, some or all of the security components featured within the security device 320 may be disengaged. For example, some of the security components featured in the security device 320 may include emitting white noise and/or noise cancelling signals. Because employing the white noise and noise cancelling signals may effectively interfere with the original sounds, such security components may hinder and interfere with the microphone's 330 ability to pick up and/or record distinct audible conversations from the room. As a result, when in the non-active mode, the security components may be disengaged so that the electronic device 310 is able to resume operation and be able to properly detect for audio and voice commands without any interference.

However, when the user no longer is engaged with the electronic device 310, the user may revert the security device 320 to active mode so that the security components may be engaged and operational. This may then give the user peace of mind that the electronic device 310 cannot listen or record the user's conversations or take images and videos of the surrounding areas.

To revert from active mode to non-active mode and vice versa, by way of example, the user may fold, slide, lift up, flip, or rotate the sectionalized pieces 340. In some instances, when the sectionalized pieces 340 are folded or rotated to expose openings the electronic device 320 this may trigger the powering off the security device 320 or at least deactivating the security components. On the contrary, when the sectionalized pieces 340 are expanded to eliminate any gaps or openings, this may trigger the turning on the security device 320 and at least activating one or more of the security components.

In other instances, the security device 320 may be triggered to be in the active or non-active mode based upon voice commands. For example, in the instance that the user seeks to place the security device 320 in the active mode, the security device 320 may be configured so that the sliding and rotating of the sectionalized pieces 342 is automated. The security device 320 may detect and recognize the voice commands from the user via the microphone 360 and the speech recognizer within the security device 320 itself. When the voice commands are recognized, the security device 320 may physically fold, slide, lift up, flip, or rotate the sectionalized pieces 342 accordingly, which may then trigger the powering on or off the security device 320.

Figure 5:
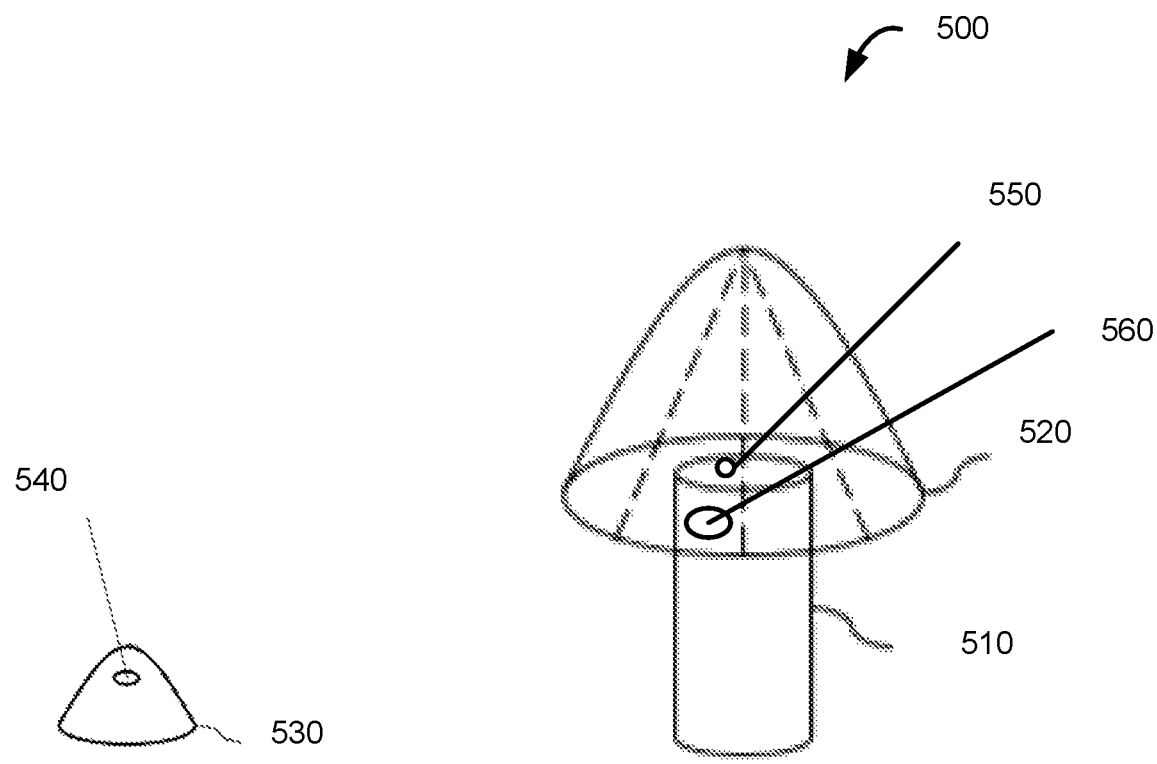
FIG. 5 illustrates a security system that includes an intelligent automated assistant device or any electronic device and a first security device and a second security device in accordance with one embodiment.

FIG. 5 illustrates a security system 500 that includes an electronic device 510, a first security device 520, and a second security device 530 in accordance with one embodiment. The electronic device 510 in this case is an intelligent automated assistant device. The components of the first security device 520 and the second security device 530 may include those as described above with reference to FIGS. 2A-2D and 3A-3B.

In some embodiments, the security devices may include one or more components configured to transmit and receive instructions wirelessly. For example, the second security device 530 may include one or more of a transmitter, a receiver, and/or other such electronic components (not shown) configured to transmit and receive wireless signal. In some embodiments, the second security device 530 may be configured to enable the first security device 520 to operate in the active mode and in the non-active mode. For example, the second security device 530 may transmit a signal to a receiver in the first security device 520, wherein the signal provides instructions as to whether the first security device 520 is to operate in the active mode or in the non-active mode.

In some instances, the second security device 530 may direct the mode of operation of the first security device 520 in response to audio commands from the user. For example, the second security device 530 may include a speech recognizer software where it can detect for audio commands picked up by the microphone 540. Thus, in the instance that the user requests the active mode of the first security device 520, the second security device 530 may detect the recognized commands via the microphone 540 and transmit a signal to the first security device 520 directing it to operate in the active mode, as alluded to above.

Furthermore, when the user has finished utilizing the electronic device 510 for the time being, the user may then activate the security features of the second security device 530 to prevent potential third parties from recording or streaming live conversations picked up by the microphone 550 or camera 560 of the electronic device 510. To power on/off the second security device 530, the user may manually do so with the push of the power button on the second security device 530 itself. In other instances, powering on and powering off of the second security device 530 may be automated. For example, the second security device 530 may include a speech recognizer software where it can detect for audio commands picked up by the microphone 540. Upon recognized commands, the second security device 530 may then power on/off based on the user's communicated request.

Additionally, the first security device 520 and the second security device 530 may include security features that may be activated only when the user has input the proper password or authentication credentials. For example, the first security device 520 and the second security device 530 may request that the user audibly dictate the combination of words, letters, phrases, numbers, etc. In further embodiments, the first security device 520 and the second security device 530 may have an input device, such a keyboard or screen, for the user to manually input the key word or password. The first security device 520 and the second security device 530 may be locked until the proper password is entered. The password may be stored in the memory or data storage of the first security device 520 and the second security device 530, respectively.

In some instances, the first security device 520 and the second security device 530 may have different passwords, thus requiring the user to unlock the first security device 520 and the second security device 530 separately. In other instances, both the first security device 520 and the second security device 530 may share the same password, and thus may be unlocked simultaneously. However, it should be noted that other authentication methods may also be used, such as biometric authentication and other methods as would be appreciated by any one of ordinary skill in the art. It should be noted that first security device 520 and the second security device 530 individually may each have its own security password. Thus, the first security device 520 and the second security device 530 disclosed in FIGS. 2A-2D and 3A-3B may also each have their own password protection security as described here with respect to FIG. 5.

Figure 6:
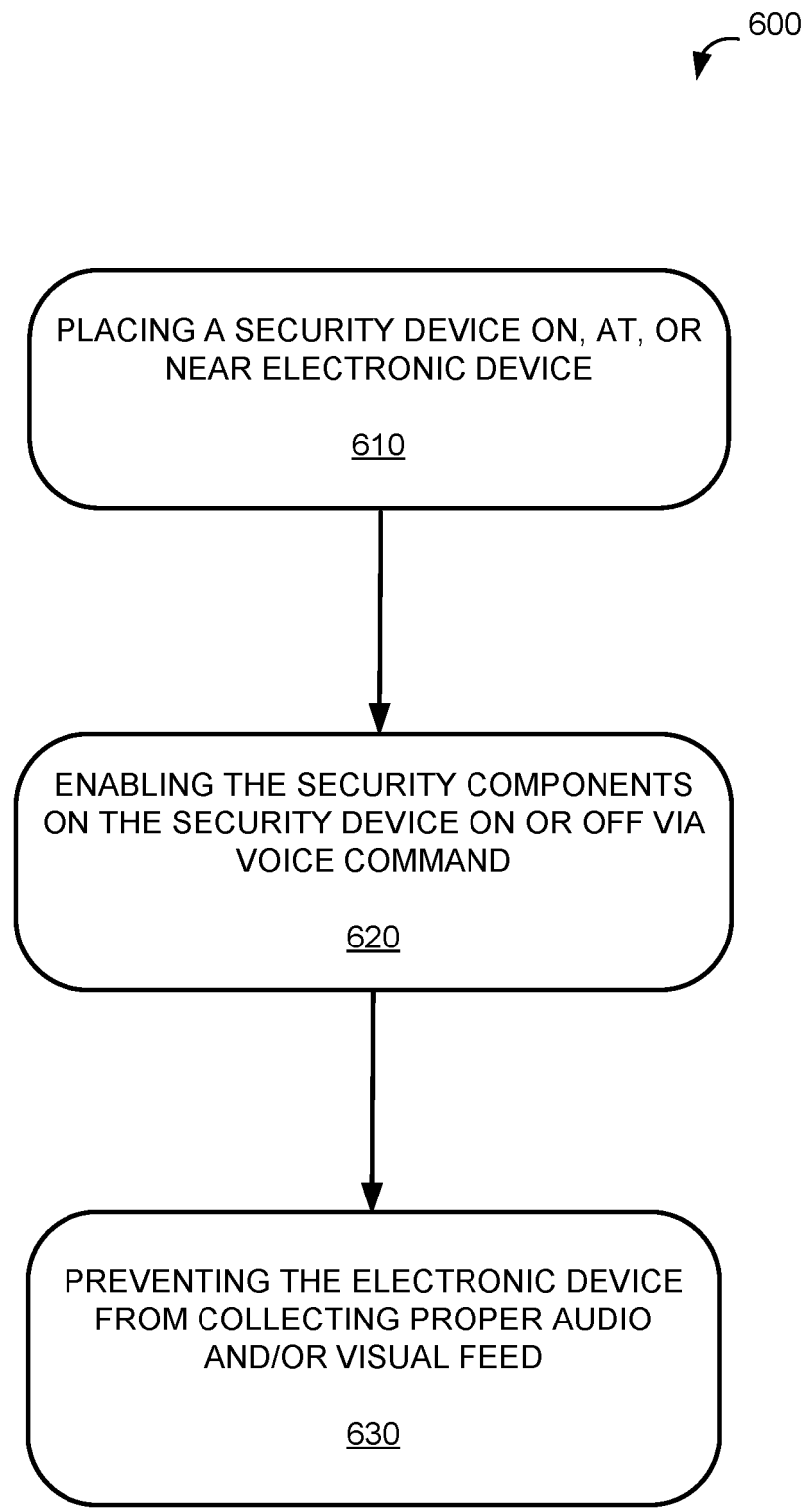
FIG. 6 illustrates an exemplary process for securing an electronic device in accordance to varying embodiments.

FIG. 6 illustrates an exemplary process for securing an electronic in accordance to varying embodiments. The exemplary process 600 may begin at step 610, where the security device may be placed on or near the electronic device. In this instance, the term "near" may be used to define any determined distance where the signal or sound waves from the security device is able to reach the electronic device.

In some instances, the security device may be composed of one component (e.g., one device total) or a total of two or more components (e.g. two or more devices in total). In the instance that the security device is composed of one component, the first component may be configured to at least distort, muffle, and conceal the sounds to be picked up by the microphone of the electronic device. As such, the first component may be placed near the electronic device to emit the white noise and noise cancelling signals towards the microphone of the electronic device.

In the instance that the security device is composed of at least two components, the first component is placed near the electronic device to at least distort, muffle, and conceal the sounds to be picked up by the microphone of the electronic device and the second component may be at least be a physical covering that shields the camera located on the electronic device. In such instances, the second component may be placed on top of the electronic device itself to at least shield or cover the camera located on the electronic device. However, it should be noted that the second component may also include the security components featured in the first component, such as those to distort, muffle, and conceal the sounds to be picked up by the microphone of the electronic device.

Next, the process 600 may proceed to step 620, where the security device may be powered on by voice activation to activate the security measures. In some instances, the security device may be password protected.

Next, the process 600 may proceed to step 630, where the security features or components of the security device may be implemented in the electronic device. These security features may prevent the camera and/or microphone from electronic device from collecting proper audio and visual feed. By way of example, one of the security components may be to physically cover the camera of the electronic device. In other instances, the other security features may be to emit the white noise and noise cancelling signals towards the microphone of the electronic device, and thus effectively distorting, muffling, and concealing the sounds to be picked up by the microphone so that clear audio is not transmitted.

Various embodiments have been described with reference to specific example features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various example embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the present application, whether or not such embodiments are described and whether or not such features are presented as being a part of a described embodiment. Thus, the breadth and scope of the present application should not be limited by any of the above-described example embodiments.

Figure 7:
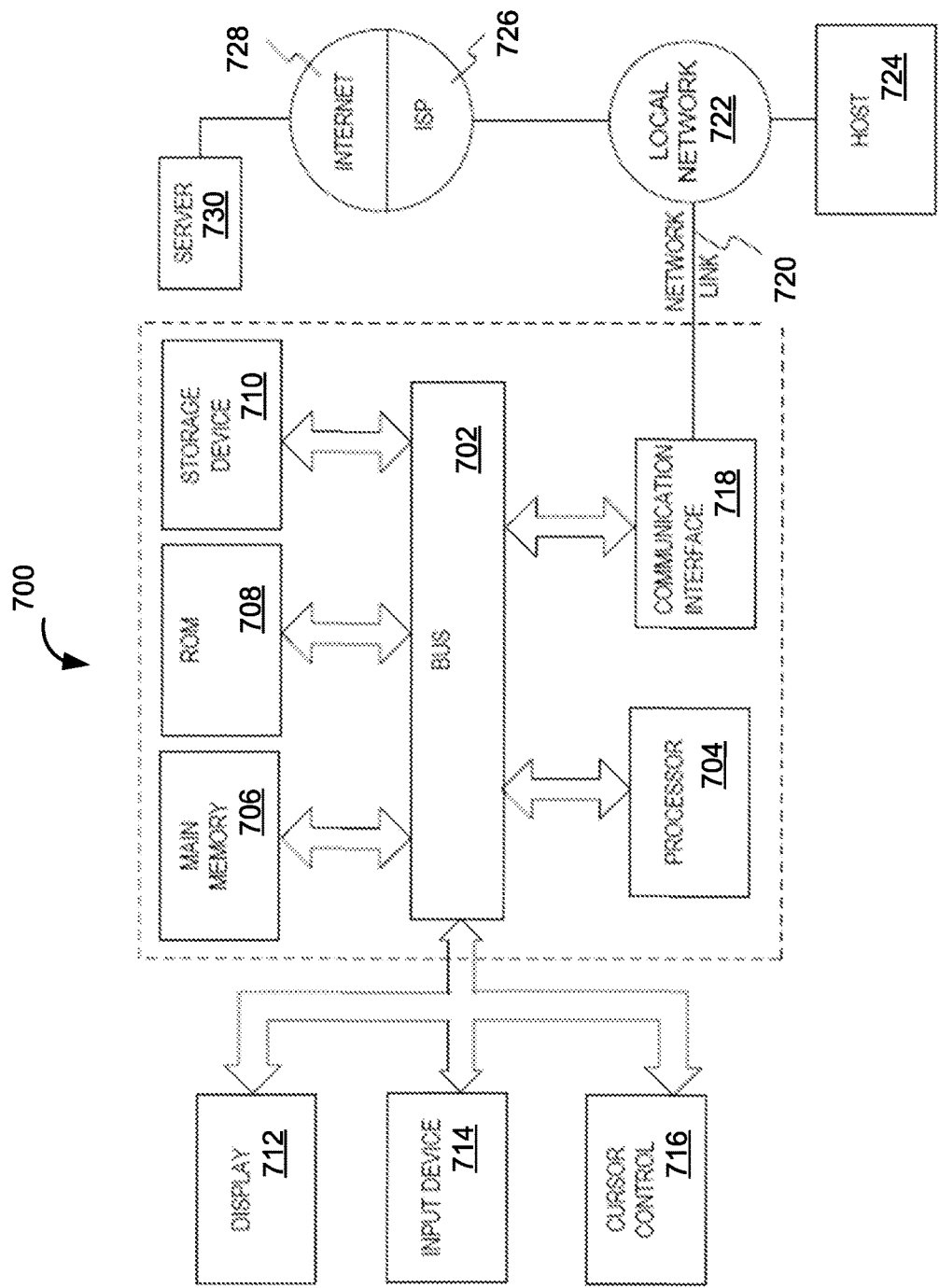
FIG. 7 illustrates an example computing module that may be used in implementing features of various embodiments.

FIG. 7 depicts a block diagram of an example computer system in which any of the embodiments described herein may be implemented. The various components illustrated in FIGS. 1-6 may be implemented according to the computer system 700. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

A network link 720 typically provides data communication through one or more networks to other data devices. For example, a network link may provide a connection through local network to a host computer 724 or to data equipment operated by an Internet Service Provider (ISP) 726. The ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server 730 might transmit a requested code for an application program through the Internet 728, the ISP 726, the local network 722 and the communication interface 718. The received code may be executed by processor 704 as it is received, and/or stored in storage device 710, or other non-volatile storage for later execution.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for operating a security device for securing a virtual assistant device including a first microphone and a camera, the method comprising:
   placing a first security device near the virtual assistant device, wherein the first security device comprises one or more security components configured to distort sounds from a sound source to be detected by the first microphone of the virtual assistant; and
   enabling the one or more security components provided in the first security device to prevent the virtual assistant device from collecting legible audio from the first microphone.

2. The method of operating a security device of claim 1, further comprising placing a second security device on or over the virtual assistant device to provide a physical cover to select areas of the virtual assistant device and to cover the camera.

3. The method of operating a security device of claim 2, wherein the first and second security devices each comprise another microphone and a speech recognition software to enable voice activation control.

4. The method of operating a security device of claim 2, wherein the first security device is communicatively coupled to the second security device via a communication protocol.

5. The method of operating a security device of claim 2, further comprising:
   transmitting a signal from the first security device to the second security device to activate the sliding, rotating, or folding of the physical cover and to enable the security components in the second security device in response to enabling the one or more security components provided in the first security device.

6. A method for operating a security device for securing a virtual assistant device including a first microphone and a camera, the method comprising:
   placing a first security device near the virtual assistant device, wherein the first security device comprises one or more security components configured to prevent the first device component from receiving input; and
   enabling the one or more security components provided in the first security device to prevent the virtual assistant device from collecting legible audio from the first microphone;
   distort sounds from a sound source to be detected by the first microphone of the virtual assistant
   wherein the security device comprises security components configured to prevent the first device component from receiving input.

7. The method of claim 6, wherein the electronic device comprises at least one of an intelligent automated assistant device, a wireless phone device, a tablet computer, a computer configured with a webcam, a doorbell device, a thermostat device, a video recording device, a television, and a voice recorder;
   wherein the electronic device is connected to an internet.

8. The method of claim 6, wherein the first device component comprises a first microphone.

9. The method of claim 8, wherein the security components distort sounds from a sound source to be detected by the first microphone.

10. The method of claim 8, wherein the security device comprises a second microphone and speech recognition software to enable voice activation control.

11. The method of claim 10, wherein the security device is configured to disable the first microphone of the electronic device upon detecting a first voice command via the second microphone of the security device.

12. The method of claim 6, wherein the electronic devices comprises a video recording component.

13. The method of claim 12, wherein the security device is configured to block the video recording component of the electronic device upon detecting a first voice command via the second microphone of the security device.

14. The method of claim 13, wherein the security device is configured to enable the first microphone of the electronic upon detecting a second voice command via the second microphone.

15. The method of claim 13, wherein the first voice command comprises a voice command to enable the security system.

16. The method of claim 15, wherein the second voice command comprises a voice command to disable the security system.

* * * * *